United States Patent
Lin et al.

(10) Patent No.: US 10,642,143 B2
(45) Date of Patent: May 5, 2020

(54) PROJECTOR AND PROJECTION CORRECTION METHOD THEREOF

(71) Applicant: Coretronic Corporation, Hsin-Chu (TW)

(72) Inventors: Ming-Tsun Lin, Hsin-Chu (TW); Hao-Chang Tsao, Hsinchu (TW); Wei-Lun Hung, Hsinchu (TW)

(73) Assignee: Coretronic Corporation, Hsin-Chu (CN)

(*) Notice: Subject to any disclaimer, the term of this patent is extended or adjusted under 35 U.S.C. 154(b) by 149 days.

(21) Appl. No.: 16/049,817

(22) Filed: Jul. 31, 2018

(65) Prior Publication Data
US 2019/0033700 A1    Jan. 31, 2019

(30) Foreign Application Priority Data

Jul. 31, 2017 (CN) .......................... 2017 1 0639124

(51) Int. Cl.
*G03B 21/53* (2006.01)
*G02B 7/36* (2006.01)
*G02B 7/09* (2006.01)
*G02B 7/02* (2006.01)
*G02B 7/08* (2006.01)

(52) U.S. Cl.
CPC .............. *G03B 21/53* (2013.01); *G02B 7/028* (2013.01); *G02B 7/08* (2013.01); *G02B 7/09* (2013.01); *G02B 7/36* (2013.01)

(58) Field of Classification Search
CPC ........ G03B 21/53; G03B 21/142; G02B 7/08; G02B 7/028; G02B 7/09; G02B 7/36

USPC ................................. 359/642, 811, 819, 820
See application file for complete search history.

(56) References Cited

U.S. PATENT DOCUMENTS

| | | | |
|---|---|---|---|
| 7,866,823 B2 * | 1/2011 | Asai ..................... | G03B 21/142 353/101 |
| 9,918,056 B2 * | 3/2018 | Nozaki ................ | H04N 9/3176 |
| 10,015,456 B2 * | 7/2018 | Toyooka .............. | G02B 26/00 |
| 10,506,206 B2 * | 12/2019 | Orlick ................ | G02B 27/0025 |
| 2011/0019109 A1 | 1/2011 | Maeda et al. | |

FOREIGN PATENT DOCUMENTS

| | | |
|---|---|---|
| CN | 101271256 | 9/2008 |
| CN | 105319815 | 2/2016 |
| WO | 2016165143 | 10/2016 |

* cited by examiner

*Primary Examiner* — Tuyen Tra
(74) *Attorney, Agent, or Firm* — JCIPRNET (57) ABSTRACT

A projection correction method adapted to a projector. The projection correction method includes: sensing a temperature of a body of the projector, so as to obtain a first temperature value, where a focusing gear of the projector is located at a first gear position; determining whether the temperature of the body of the projector is changed, and when the temperature of the body of the projector is changed from the first temperature value to a second temperature value, the focusing gear is rotated by a predetermined distance to rotate the focusing gear to a second gear position; and determining whether a storage device stores a target gear position corresponding to the second temperature value, so as to rotate the focusing gear to the target gear position. Moreover, a projector using the aforementioned projection correction method is also provided.

16 Claims, 9 Drawing Sheets

PROJECTOR AND PROJECTION CORRECTION METHOD THEREOF

CROSS-REFERENCE TO RELATED APPLICATION

This application claims the priority benefit of China application serial no. 201710639124.8, filed on Jul. 31, 2017. The entirety of the above-mentioned patent application is hereby incorporated by reference herein and made a part of this specification.

BACKGROUND OF THE INVENTION

Field of the Invention

The invention relates to a correction technique, and particularly relates to a projection correction method and a projector using the same.

Description of Related Art

In a technical field of projector, in theory, a focusing effect of a projection image projected by the projector should be able to maintain the same clear quality regardless of how long it takes. However, in an actual operation result of the projector, since components such as a gear set and a lens of the projector have the effect of thermal expansion and contraction, a focal length of the projection image projected by the projector may have a different degree of offset along with a change of an environmental temperature. When the offset exceeds a certain degree, it is easy for a user to perceive that the projection image is not clear, which severely affects the user's viewing quality.

In order to resolve the problem of defocus caused by the temperature variation of the body of the projector, in a development stage of projector products, different focus adjustment methods are usually designed to mitigate the natural defocus condition. However, limited by the projector production cost or technical bottlenecks, the conventional improvement cannot effectively resolve the aforementioned problem of defocus. Therefore, in order to effectively mitigate the problem of defocus of the projection image caused by the temperature variation of the body of the projector to effectively improve the image quality of the projection image of the projector, a plurality of embodiments of the invention is provided below to serve as solutions.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projection correction method and a projector, which are adapted to automatically correct a gear position of a focusing gear of the projector along with a temperature variation of a body of the projector, such that the projector is able to provide a clear projection image and a good user experience.

In order to achieve one or a portion of or all of the objects or other objects, an embodiment of the invention provides a projection correction method adapted to a projector. The projection correction method includes: sensing a temperature of a body of the projector by a temperature sensor, so as to obtain a first temperature value, where a focusing gear of the projector is located at a first gear position; determining whether the temperature of the body of the projector is changed, and when the temperature of the body of the projector is changed from the first temperature value to a second temperature value, the focusing gear is rotated by a predetermined distance to rotate the focusing gear to a second gear position; and determining whether a storage device stores a target gear position corresponding to the second temperature value, so as to rotate the focusing gear to the target gear position.

In order to achieve one or a portion of or all of the objects or other objects, an embodiment of the invention provides a projector including a focusing gear, a temperature sensor, a processing device and a storage device. The focusing gear is located at a first gear position. The temperature sensor is configured to sense a temperature of a body of the projector to obtain a first temperature value. The processing device is coupled to the temperature sensor and controls the focusing gear. The processing device is configured to determine whether the temperature of the body of the projector is changed by the temperature sensor, and rotates the focusing gear by a predetermined distance when the temperature of the body of the projector is increased from the first temperature value to a second temperature value, so as to rotate the focusing gear to a second gear position. The storage device is coupled to the processing device. The processing device determines whether the storage device stores a target gear position corresponding to the second temperature value to rotate the focusing gear to the target gear position.

According to the above description, the projection correction method and the projector of the invention may automatically correct the gear position of the focusing gear according to a predetermined characteristic curve, such that the gear position of the focusing gear may be automatically changed along with the temperature variation of the body of the projector. Moreover, in the projection correction method and the projector of the invention, the predetermined characteristic curve may be adjusted through user's manual operation or automatically adjusted by the projector. Therefore, the projector of the invention may automatically correct the gear position of the focusing gear according to the adjusted characteristic curve, such that a correction result of the gear position of the focusing gear is closer to a real temperature variation condition.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
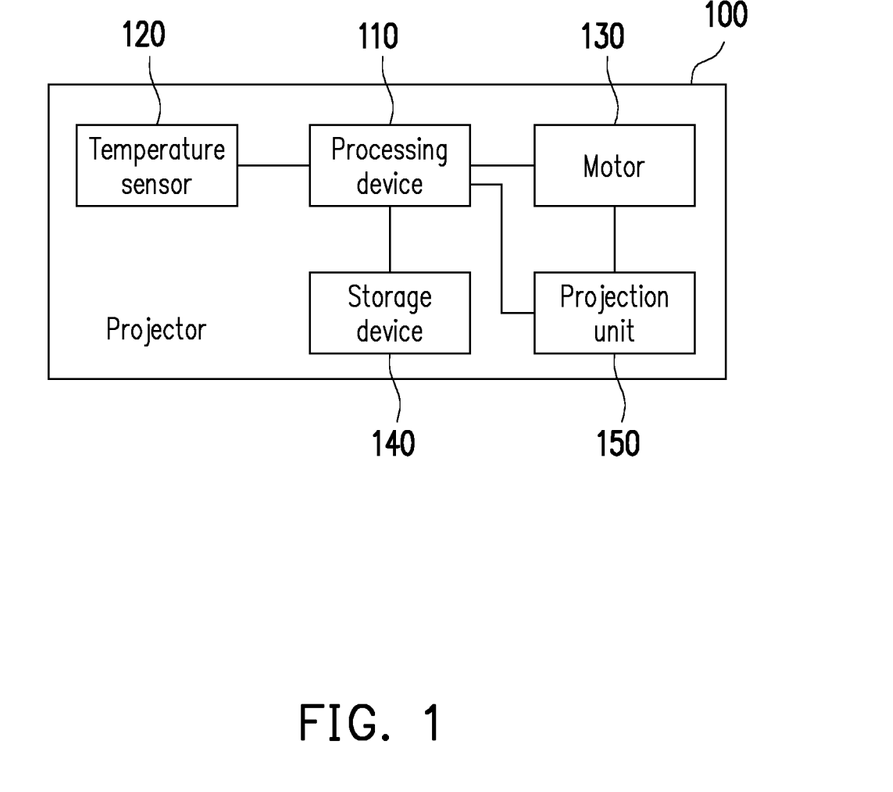
FIG. 1 is a block diagram of a projector according to an embodiment of the invention.

FIG. 1 is a block diagram of a projector according to an embodiment of the invention. Referring to FIG. 1, in the embodiment, the projector 100 includes a processing device 110, a temperature sensor 120, a motor 130, a storage device 140 and a projection unit 150. The processing device 110 is coupled to the temperature sensor 120, the motor 130, the storage device 140 and the projection unit 150, where the projection unit 150 may further include a lens set and a gear set, etc., which is not limited by the invention. In the embodiment, the motor 130 is, for example, a direct current (DC) motor, and the motor 130 is coupled to the gear set of the projection unit 150 to drive the gear set to rotate.

In the embodiment, the gear set may include a focusing gear, and the lens set may include a plurality of lens elements. In the embodiment, the focusing gear of the gear set may be configured to adjust a focal length of the lens set of the projection unit 150, such that the projection unit 150 may project a clear projection image. Moreover, in the embodiment, the temperature sensor 120 is configured to sense a temperature of a body of the projector 100, and the processing device 110 determines whether to adjust the focusing gear according to a sensing result of the temperature sensor 120.

In the embodiment, the processing device 110 is, for example, a central processing unit (CPU) having a data processing function and a computation function, or other programmable general purpose or special purpose microprocessor, a digital signal processor (DSP), an image processing unit (IPU), a graphics processing unit (GPU), a programmable controller, an application specific integrated circuits (ASIC), a programmable logic device (PLD) or other similar device or a combination of the above devices.

In the embodiment, the storage device 140 is, for example, any type of a fixed or movable random access memory (RAM), a read-only memory (ROM), a flash memory or a similar device or a combination of the above devices. The storage device 140 is configured to store a plurality of modules and related data, and the processing device 110 may respectively execute the modules to implement the projection correction method of the embodiments of the invention.

Figure 2A:
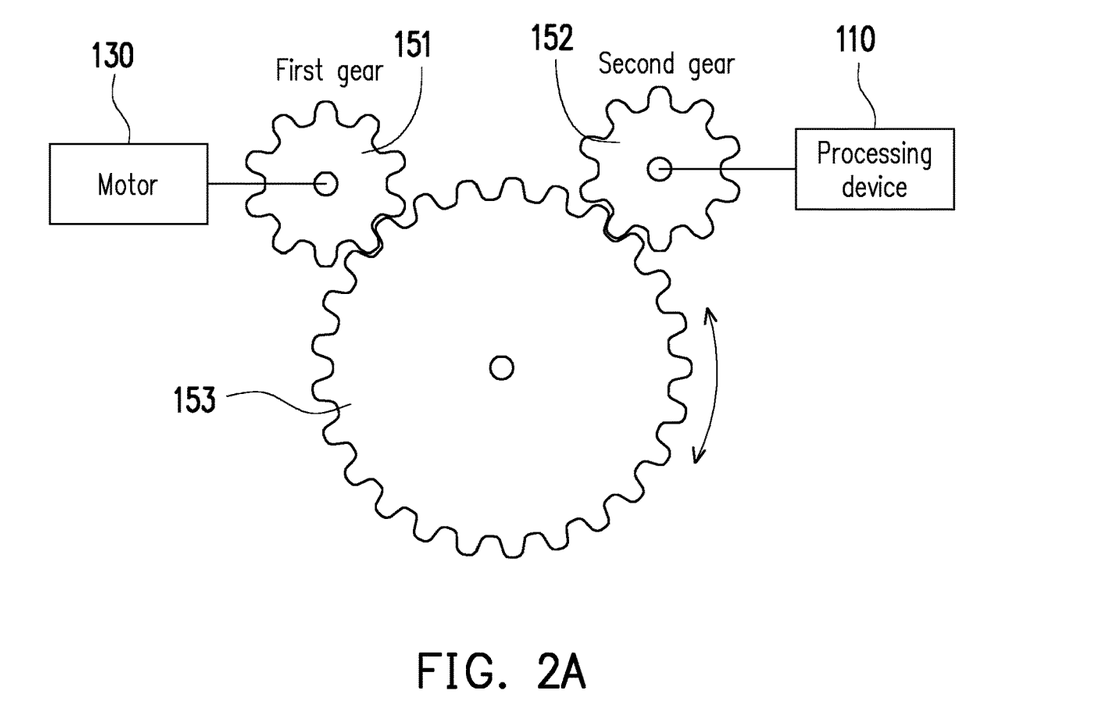
FIG. 2A is a schematic diagram of a gear set according to an embodiment of the invention.

FIG. 2A is a schematic diagram of a gear set according to an embodiment of the invention. Referring to FIG. 2A, in the embodiment, the projection unit 150, for example, includes a first gear 151, a second gear 152 and a focusing gear 153. In the embodiment, the focusing gear 153 is configured to adjust a focusing effect of the projection image projected by the projection unit 150. In detail, the focusing gear 153 is rotated to adjust a focal length of the lens set of the projection unit 150, i.e. to adjust a distance between the lens set of the projection unit 150 and a projection surface (not shown). The first gear 151 is engaged with the focusing gear 153. The second gear 152 is engaged with the focusing gear 153, and the second gear 152 is integrated with a variable resistor (not shown). In other words, the second gear 152 is rotated to change a resistance of the variable resistor. In the embodiment, the first gear 151 is coupled to the motor 130, and the second gear 152 is coupled to the processing device 110. In the embodiment, the motor 130 is configured to drive the first gear 151 to rotate. The first gear 151 drives the focusing gear 153 to rotate, and meanwhile drives the second gear 152 to rotate. In the embodiment, the variable resistor electrically connected to the second gear 152 may output a DC voltage signal to the processing device 110 according to a rotation result of the second gear 152, and the processing device 110 determines a voltage value of the DC voltage signal to obtain position data corresponding to the focusing gear 153. It should be noted that in various embodiments of the invention, the position data is represented in a numerical value form, where a magnitude of the numerical value represents a moving amount of the focusing gear 153, or the magnitude of the numerical value may correspond to a gear position of the focusing gear 153, though the invention is not limited thereto.

Figure 2B:
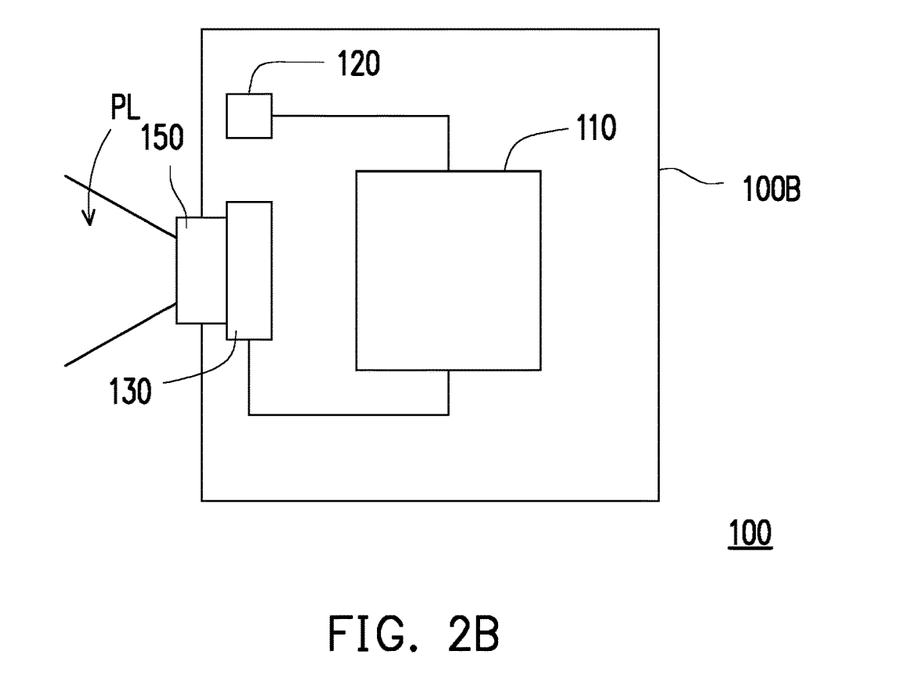
FIG. 2B is a schematic diagram of a projector according to an embodiment of the invention.

FIG. 2B is a schematic diagram of a projector according to an embodiment of the invention. Referring to FIG. 2B, a projector body 100B of the projector 100 may include various components mentioned in the embodiments of FIG. 1 and FIG. 2A. In the embodiment, a configuration relationship of the processing device 110, the temperature sensor 120, the motor 130 and the projection unit 150 may be as that shown in FIG. 2B. In the embodiment, the motor 130 is integrated with the projection unit 150, and the processing device 110 drives the projection unit 150 to project a projection beam PL to a projection surface, such that the projection image is displayed on the projection surface. In the embodiment, the temperature sensor 120 is configured in the projector body 100B, and configured at a position close to the projection unit 150. Therefore, a temperature of the body of the projector 100 sensed by the temperature sensor 120 may be close to an actual temperature of the projection unit 150, and the processing device 110 may adjust a gear position of the focusing gear 153 configured in the projection unit 150 according to a sensing result of the temperature sensor 120. However, the configuration position of the temperature sensor 120 of the invention is not limited to the position shown in FIG. 2B, and the temperature sensor 120 may be disposed at a place with the highest temperature in the projection body 100B, though the invention is not limited thereto. In an embodiment, the temperature sensor 120 may also be integrated with the projection unit 150, or may sense a temperature of the focusing gear 153 or other member and the electronic circuit in a contact manner. The temperature sensor 120 is, for example, a thermocouple or a thermistor, though the invention is not limited thereto.

Figure 3:
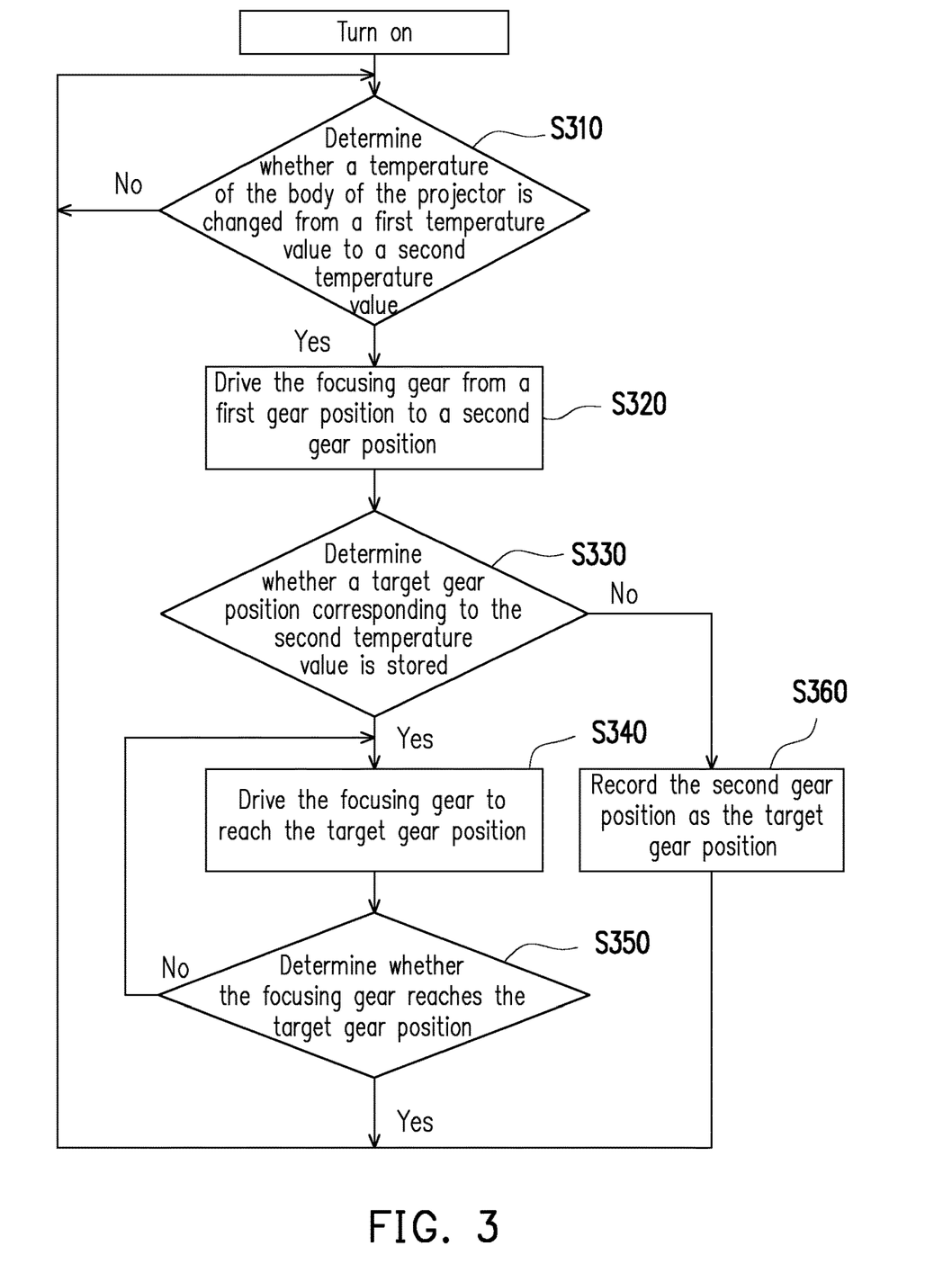
FIG. 3 is a flowchart illustrating an automatic focus compensation procedure according to an embodiment of the invention.

FIG. 3 is a flowchart illustrating an automatic focus compensation procedure according to an embodiment of the invention. Referring to FIG. 1 and FIG. 3, in the embodiment, after the projector 100 is turned on, the projector 100 may automatically correct a position of the focusing gear along with a temperature variation of the body of the projector 100, so as to adjust a distance between the projection unit 150 and the projection surface to enhance a focusing effect of the projection image. Therefore, in step S310, after a predetermined time (for example, 5-7 minutes) after the projector 100 is turned on, the processing device 110 senses the temperature of the body of the projector 100 through the temperature sensor 120, and determines whether the temperature of the body of the projector 100 is changed from a first temperature value to a second temperature value. If yes, in step S320, the processing device 110 drives the motor 130 to drive the focusing gear to rotate from a first gear position to a second gear position according to a predetermined distance and a characteristic curve, where the predetermined distance and the characteristic curve are described in detail below. If not, the step S310 is re-executed.

In the embodiment, when the focusing gear 153 is rotated towards the second gear position, the processing device 110 determines whether the storage device 140 stores a target gear position corresponding to the second temperature value. If yes, in step S340, the processing device 110 controls the motor 130 to further drive the focusing gear 153 to rotate, such that the focusing gear 153 reaches the target gear position, where the target gear position is the second gear position. If not, in step S360, the processing device 110 records the second gear position as the target gear position, and stores the same in the storage device 140.

In the embodiment, in step S350, after the focusing gear 153 is rotated to the target gear position, the processing device 110 determines whether the focusing gear 153 reaches the target gear position. If yes, the processing device 110 re-executes the step S310 until the projector 100 is turned off. If not, the processing device 110 drives the motor 130 to continually rotate the focusing gear 153 until the focusing gear 153 reaches the target gear position. Therefore, in the embodiment, after the user turns on the projector 100, the projector 100 may automatically correct the position of the focusing gear according to a temperature variation of the body of the projector 100, so as to effectively mitigate the problem of defocus of the projection image caused by temperature variation of the focusing gear 153 and the lens set of the projection unit 150.

Figure 4:
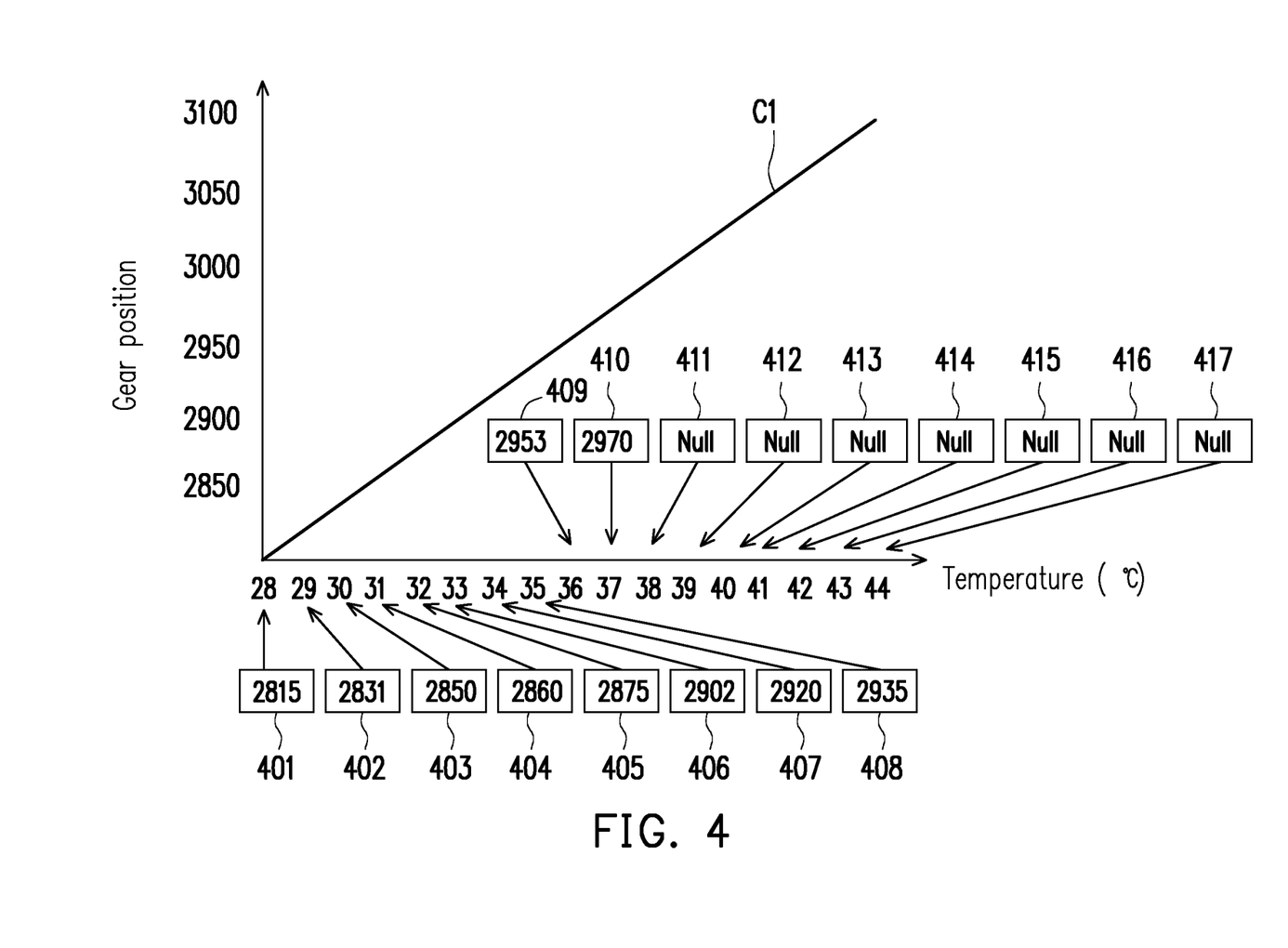
FIG. 4 is a schematic diagram illustrating a relationship between gear positions and temperature values according to an embodiment of the invention.

FIG. 4 is a schematic diagram illustrating a relationship between gear positions and temperature values according to an embodiment of the invention. Referring to FIG. 1, FIG. 3 and FIG. 4, in the embodiment, after the projector 100 is turned on, the processing device 110 may execute the automatic focus compensation procedure of the embodiment of FIG. 3. In the embodiment, the storage device 140 of the projector 100 may pre-store a characteristic curve C1, i.e. a relationship equation of the gear positions and the temperature values, and the storage device 140 further includes a plurality of storage positions, for example, 401-417. In the embodiment, the storage positions 401-417 are configured to store position data of a plurality of target gear positions of the focusing gear 153 corresponding to each unit temperature from an initial temperature value (for example, 28° C.) to a final temperature value (for example, 44° C.), and the storage positions 401-417 are rewritable. In the embodiment, when the temperature of the body of the projector 100 is changed, if the projection image projected by the projection unit 150 is required to be maintained clear, the gear position of the focusing gear 153 is required to be correspondingly adjusted along with the temperature value of the temperature of the body of the projector 100 according to the characteristic curve C1.

To be specific, when the temperature of the body of the projector 100 is increased, the projection image projected by the projection unit 150 is probably defocused, so that the focusing gear 153 must be compensatively rotated accordingly, and the projection image projected by the projection unit 150 is maintained clear. Therefore, in the embodiment, the processing device 110 may read data of the characteristic curve C1 pre-stored in the storage device 140 to provide a plurality of target gear position corresponding to different temperature values. Namely, when the temperature of the body of the projector 100 is increased to a certain temperature value, the processing device 110 may rotate the focusing gear 153 to the target gear position corresponding to the certain temperature value, such that the projection image projected by the projection unit 150 is maintained clear.

Referring to the automatic focus compensation procedure of the embodiment of FIG. 3, for example, after the projector 100 is turned on, if the temperature of the body of the projector 100 is increased from 31° C. to 32° C., the processing device 110 drives the focusing gear 153 through the motor 130 to rotate the gear position of the focusing gear by a predetermined distance from "2860". Moreover, the processing device 110 reads the target gear position corresponding to the temperature value of 32° C., and controls the motor 130 to drive the focusing gear, so as to further compensatively rotate the gear position of the focusing gear to "2875". Therefore, a focusing effect of the projection image projected by the projection unit 150 of the projector 100 may be correspondingly adjusted along with an increase in temperature, so as to maintain the projection image to be clear. Moreover, for another example, after the projector 100 is turned on, if the temperature of the body of the projector 100 is increased from 37° C. to 38° C., the processing device 110 drives the focusing gear 153 through the motor 130, and the gear position of the focusing gear 153 is directly moved to a gear position "2970" of the focusing gear 143 corresponding to the temperature 37° C. from the gear position of the focusing gear 153 recorded last time when the projector is turned off, and then the focusing gear 153 is rotated by a predetermined distance to the gear position of the focusing gear 153 corresponding to the temperature 38° C. However, since the storage position 411 corresponding to the temperature value of 38° C. is not pre-stored with any target gear position, the processing device 110 may directly record the gear position of the focusing gear 153 rotated by the predetermined distance from "2970" to serve as the target gear position corresponding to the temperature value of 38° C. according to the pre-stored characteristic curve C1.

It should be noted that in the embodiment, the predetermined distance refers to a rotation amount of the gear position of the focusing gear 153 required to be compensatively rotated in case of each temperature variation of 1° C., i.e. the relationship between the gear positions and the temperature values presented by the characteristic curve C1. Moreover, in the embodiment, the gear positions "2815", "2831", "2850", etc., shown in FIG. 4 are only used for representing magnitudes of rotation amounts of the focusing gear, though the invention is not limited thereto. In an embodiment, the gear position may also be presented by a magnitude of any length unit, angle unit or variable resistance. Moreover, in the embodiment, the characteristic curve C1 may be a regular straight line variation or a curved line variation or irregular curved line variation, which is not limited as that shown in FIG. 4.

Figure 5:
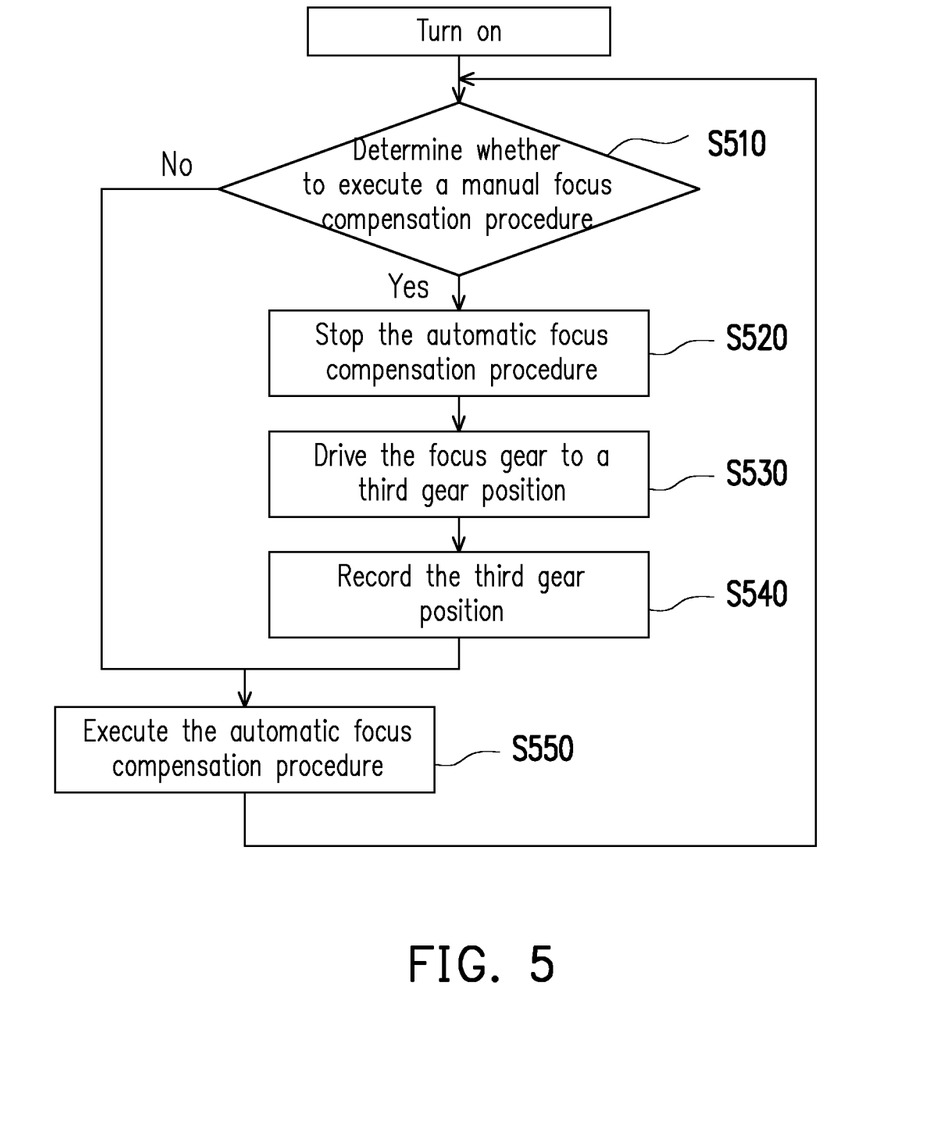
FIG. 5 is a flowchart illustrating a manual focus compensation procedure according to an embodiment of the invention.

FIG. 5 is a flowchart illustrating a manual focus compensation procedure according to an embodiment of the invention. Referring to FIG. 1, FIG. 3 and FIG. 5 in the embodiment, during the process of the automatic focus compensation procedure of the embodiment of FIG. 3, if the user wants to manually adjust the focusing effect of the projection image, the processing device 110 of the projector 100 may automatically record the gear position of the focusing gear 153 adjusted by the user. Therefore, in the embodiment, the projector 100 further includes an input device, where the input device is, for example, keys, buttons or a remote controller, etc., which is not limited by the invention. In step S510, the processing device 110 determines whether to execute a manual focus compensation procedure according to whether the user uses the input device to provide an adjusting signal to control the focusing gear. If not, in step S550, the processing device 110 continually executes the automatic focus compensation procedure. If yes, in step S520, the processing device 110 stops the automatic focus compensation procedure.

Then, in step S530, the processing device 110 drives the motor 130 according to the adjusting signal provided by the input device, so as to rotate the focusing gear 153 to a third gear position. Moreover, in step S540, the processing device 110 records the third gear position as the target gear position. When the manual focus compensation procedure is ended, in step S550, the processing device 110 executes the automatic focus compensation procedure to resume executing the automatic focus compensation procedure of the embodiment of FIG. 3.

Figure 6:
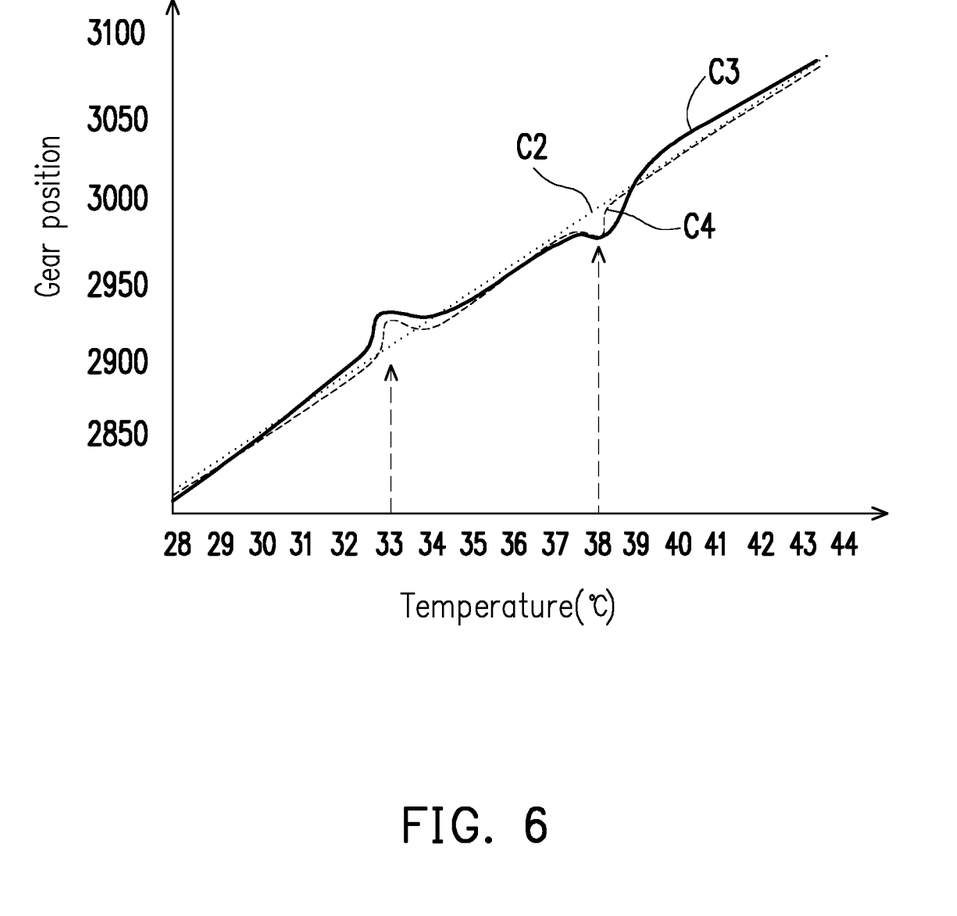
FIG. 6 is a schematic diagram illustrating a relationship between gear positions and temperature values according to another embodiment of the invention.

FIG. 6 is a schematic diagram illustrating a relationship between gear positions and temperature values according to another embodiment of the invention. Referring to FIG. 1, FIG. 3, FIG. 5 and FIG. 6, in the embodiment, after the projector 100 is turned on, the processing device 110 may execute the automatic focus compensation procedure and the manual focus compensation procedure of the embodiments of FIG. 3 and FIG. 5. In the embodiment, the storage device 140 of the projector 100 may pre-store a characteristic curve C2. However, since an ideal characteristic curve C3 of the relationship between the gear positions and the temperature values of the focusing gear of the projector 100 probably has differences with the characteristic curve C2 pre-stored in the storage device 140 at temperature values of 33° C. and 38° C., the user may record new target gear positions in allusion to gear positions of the focusing gear corresponding to the specific temperatures through the manual focus compensation procedure of the embodiment of FIG. 5.

To be specific, when the temperature of the body of the projector 100 is 33° C. or 38° C., the processing device 110 executes the automatic focus compensation procedure according to the characteristic curve C2, and drives the focusing gear through the motor 130, such that the gear position of the focusing gear 153 is rotated to the predetermined target gear position corresponding to the temperature of 33° C. or 38° C. However, if the projection image projected by the projection unit 150 is still not clear or the focusing effect thereof is not good, the user may manually adjust the gear position of the focusing gear 153 through the input device of the projector 100, and the processing device 110 records the target gear position manually adjusted by the user. Therefore, the characteristic curve C2 pre-stored in the storage device 140 may be modified to a characteristic curve C4 after the manual focus compensation procedure, and the characteristic curve C4 is closer to the ideal characteristic curve C3 compared with the characteristic curve C2.

Figure 7:
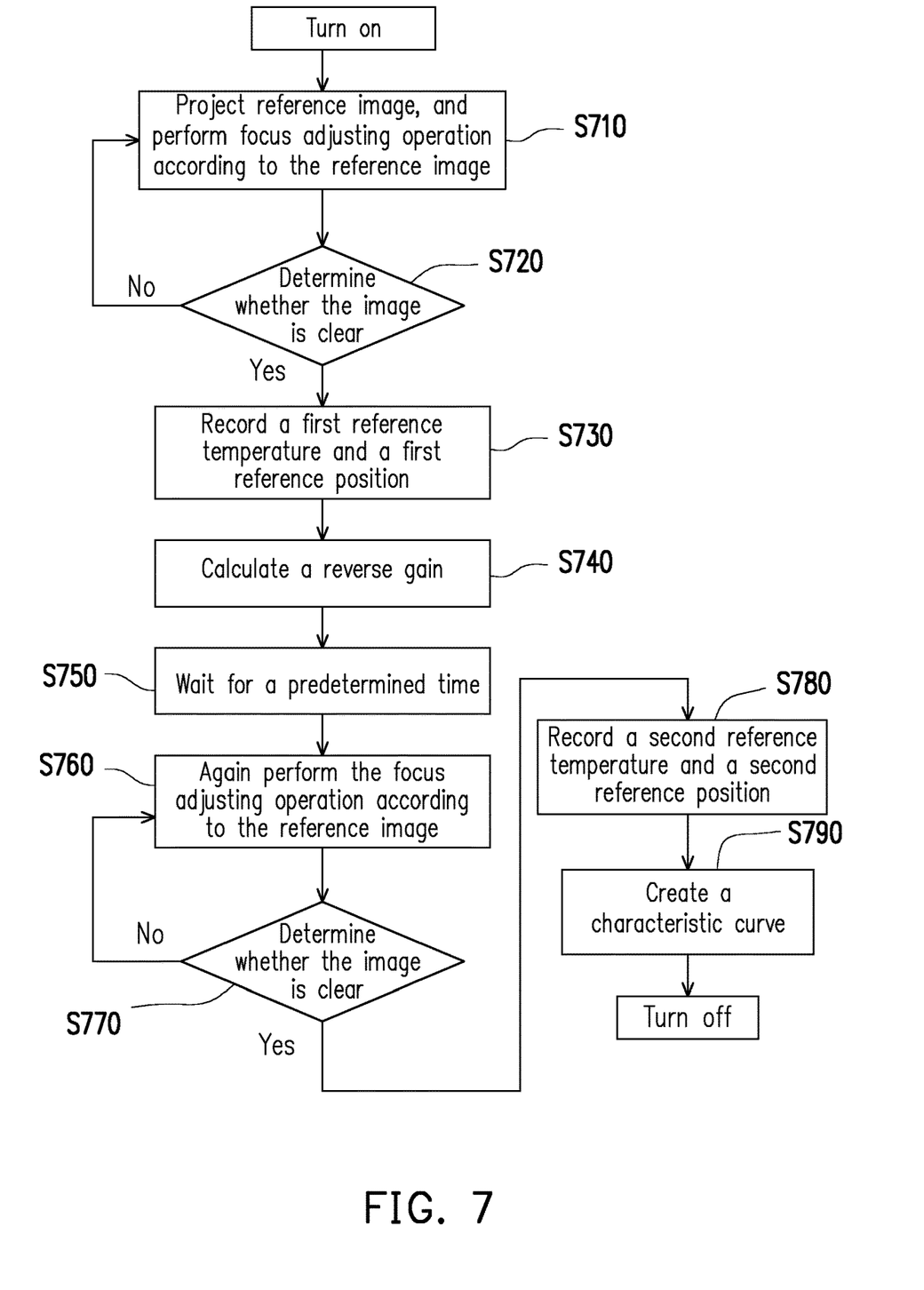
FIG. 7 is a flowchart illustrating a first pre-correction procedure according to an embodiment of the invention.

FIG. 7 is a flowchart illustrating a first pre-correction procedure according to an embodiment of the invention. Referring to FIG. 1 and FIG. 7, in the embodiment, after the projector 100 is turned on, the processing device 110 may first execute the first pre-correction procedure to pre-create the characteristic curves C1, C2 shown in FIG. 4 and FIG. 6. Therefore, in step S710, the projector 100 projects a reference image through the projection unit 150, and the user or the processing device 110 may perform a focus adjusting operation according to whether the reference image is clear, so as to adjust the gear position of the focusing gear 153 according to the adjusting signal received by the input device, where the reference image, for example, includes black and white grids or black and white stripes, though the invention is not limited thereto. In step S720, the user or the processing device 110 determines whether the image is clear, where the user may determine whether the projected reference image is clear through the two eyes, and the processing device 110 may capture the projected reference image by an image capturing device (not shown) such as a camera, etc., and the processing device 110 determines whether the projected reference image is clear by an algorithm, for example, an image comparison method, where the algorithm of image comparison is known by those skilled in the art, and detail thereof is not repeated. If yes, in step S730, the processing device 110 records a first reference temperature and a first reference position. If not, the processing device 110 re-executes the step S710.

Then, in steps S740-S760, the processing device 110 may calculate reverse gain, and wait for a predetermined time (for example, 5-7 minutes). After the projector 100 waits for the predetermined time, since the temperature of the body of the projector 100 starts to change, the projector 100 again performs the focus adjusting operation according to the reference image, so as to receive the adjusting signal through the input device to again adjust the gear position of the focusing gear. Moreover, in step S770, the processing device 110 determines whether the image is clear. If yes, in step S780, the processing device 110 records a second reference temperature and a second reference position. If not, the processing device 110 re-executes the step S760. Therefore, in step S790, the processing device 110 creates a characteristic curve according to the first reference temperature, the first reference position, the second reference temperature and the second reference position, and the processing device 110 determines a predetermined distance according to the characteristic curve.

Figure 8:
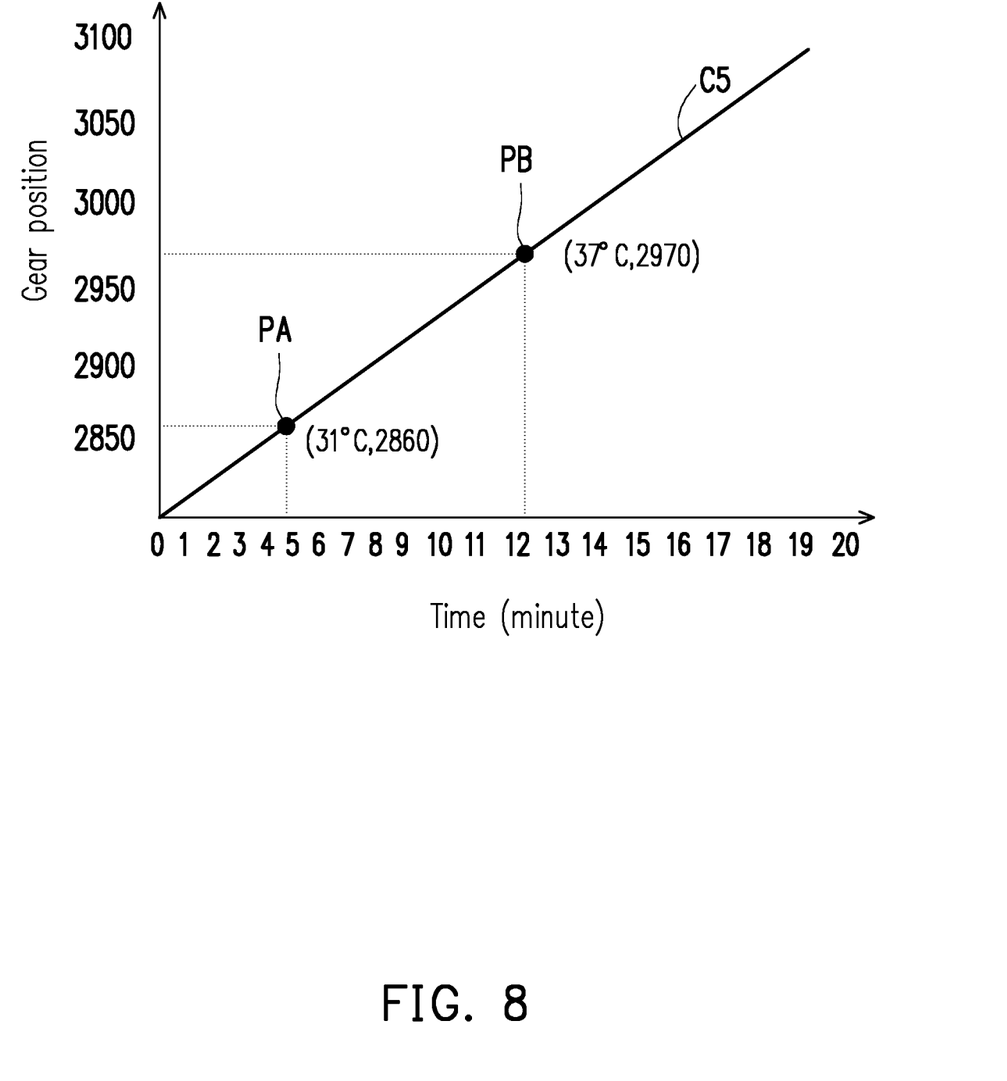
FIG. 8 is a schematic diagram illustrating a relationship between gear positions and gear rotation time according to an embodiment of the invention.

FIG. 8 is a schematic diagram illustrating a relationship between gear positions and gear rotation time according to an embodiment of the invention. Referring to FIG. 1, FIG. 7 and FIG. 8, in the embodiment, the projector 100 executes the first pre-correction procedure of the embodiment of FIG. 7 to create the characteristic curve. For example, after the projector 100 is turned on for 5 minutes, the processing device 110 records the gear position of the focusing gear and senses a current temperature by the temperature sensor 120, where the gear position is, for example, "2860", and the corresponding temperature value is, for example, 31° C. Then, after the projector 100 is turned on for 12 minutes, the processing device 110 again records the gear position of the focusing gear and senses the current temperature by the temperature sensor 120, where the gear position is, for example, "2970", and the corresponding temperature value is, for example, 37° C. Therefore, the processing device 110 may obtain two reference points PA, PB, and the processing device 110 creates a characteristic curve C5 according to the two reference points PA, PB, where the characteristic curve C5 may be a linear equation. Moreover, the processing device 110 may calculate a rotation amount required for compensation rotation for the gear position of the focusing gear each time when the temperature is changed by 1° C., so as to determine the predetermined distance of the aforementioned embodiments.

For another example, in the aforementioned embodiment, a temperature difference between the two reference points PA and PB is, for example, 37° C.-31° C.=6° C., and a difference of the rotation amounts of the focusing gear is 2970-2860=110. Namely, when the temperature is changed by 1° C., the rotation amount required for compensation of the gear position is about 18.3 (110/6). Therefore, the predetermined distance of the aforementioned embodiments may be deduced according to a temperature variation amount and the rotation amount required for compensation of the gear position.

Figure 9:
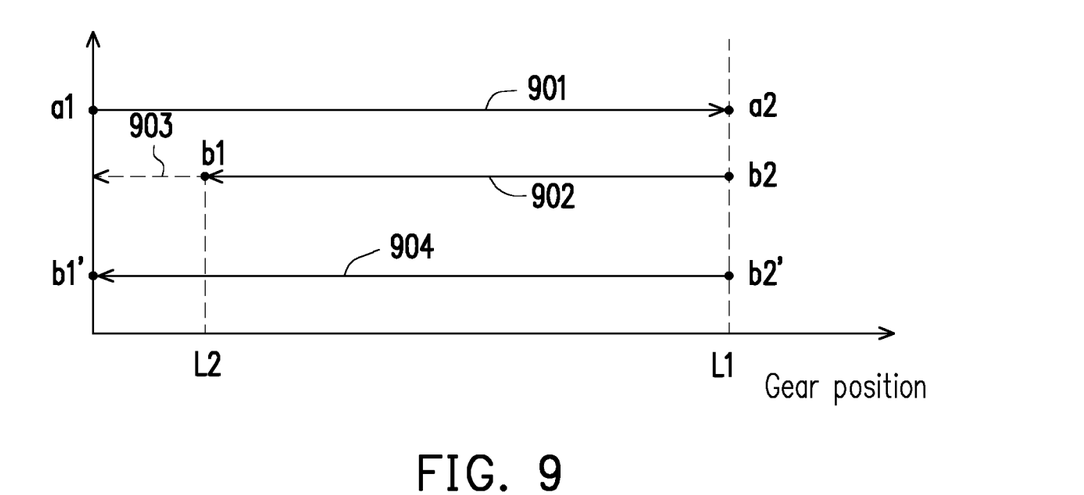
FIG. 9 is a schematic diagram of a second pre-correction procedure according to an embodiment of the invention.

FIG. 9 is a schematic diagram of a second pre-correction procedure according to an embodiment of the invention. Referring to FIG. 1, FIG. 7 and FIG. 9, in the embodiment, the processing device 110 may execute the second pre-correction procedure to obtain a reverse gain. In detail, under the condition of a same rotation time, due to a manufacturing tolerance or an assembling tolerance of the focusing gear, the gear positions of a forward rotation and a reverse rotation of the focusing gear probably have an error, so that the processing device 110 may execute the second pre-correction procedure to obtain the reverse gain, so as to correct the rotation time of the forward rotation and the reverse rotation of the focusing gear.

For example, as shown in FIG. 9, when the projector 100 is rotated towards a first rotation direction (for example, the forward rotation) in the predetermined time, the focusing gear is rotated from a reference position a1 to a reference position a2, a rotation amount 901 (a displacement amount) of the focusing gear may be equivalent to L1 (a2−a1). Moreover, when the projector 100 is rotated towards a second rotation direction (for example, the reverse rotation) in the same predetermined time, the focusing gear is rotated from a reference position b2 to a reference position b1, a rotation amount 902 of the focusing gear may be equivalent to L1−L2 (a2−a1), where the reference position a2 is the same to the reference position b2. Therefore, the processing device 110 may obtain a rotation amount difference 903 of L2 of the gear positions of the forward rotation and the reverse rotation of the focusing gear, and the processing device 110 may obtain the reverse gain according to following equations (1) and (2):

$$\text{gain} = 1 + \frac{L2}{L1-L2}, \text{ when } L1-L2 \leq L1 \quad \text{equation (1)}$$

$$\text{gain} = 1 - \frac{L2}{L1-L2}, \text{ when } L1-L2 > L1 \quad \text{equation (2)}$$

Namely, according to the aforementioned equations (1) and (2), when the focusing gear is rotated towards the first rotation direction by a predetermined time, a rotation amount 901 that the gear position of the focusing gear is rotated from the reference position a1 to the reference position a2 is equal to a rotation amount 904 that the gear position of the focusing gear is rotated from the reference position b2' to the reference position b1' after the focusing gear is rotated towards the second rotation direction by a predetermined time multiplied by the reverse gain, where the reference position a1 is equal to the reference position b1', and the reference position a2 is equal to the reference position b2'. For another example, if the gain is 1.2, the rotation amount of the focusing gear rotated towards the first rotation direction by 1 second is equal to the rotation amount of the focusing gear rotated towards the second rotation direction by 1.2 seconds. Therefore, in the embodiment, the processing device 110 may execute the second pre-correction procedure to obtain the reverse gain, such that the focusing gear of the projector 100 may be rotated to the correct gear position during the process of rotating towards the first rotation direction (the forward direction) and the second rotation direction (the reverse direction).

Moreover, the calculation method of the reverse gain of the embodiment is also adapted to calculate a forward gain. Namely, in an embodiment, the projector 100 may also multiply the rotation time of the forward rotation by the forward gain, such that the focusing gear of the projector 100 may be rotated to the correct gear position during the forward rotation process and the reverse rotation process, and the invention is not limited to the aforementioned method of using the reverse gain.

Figure 10:
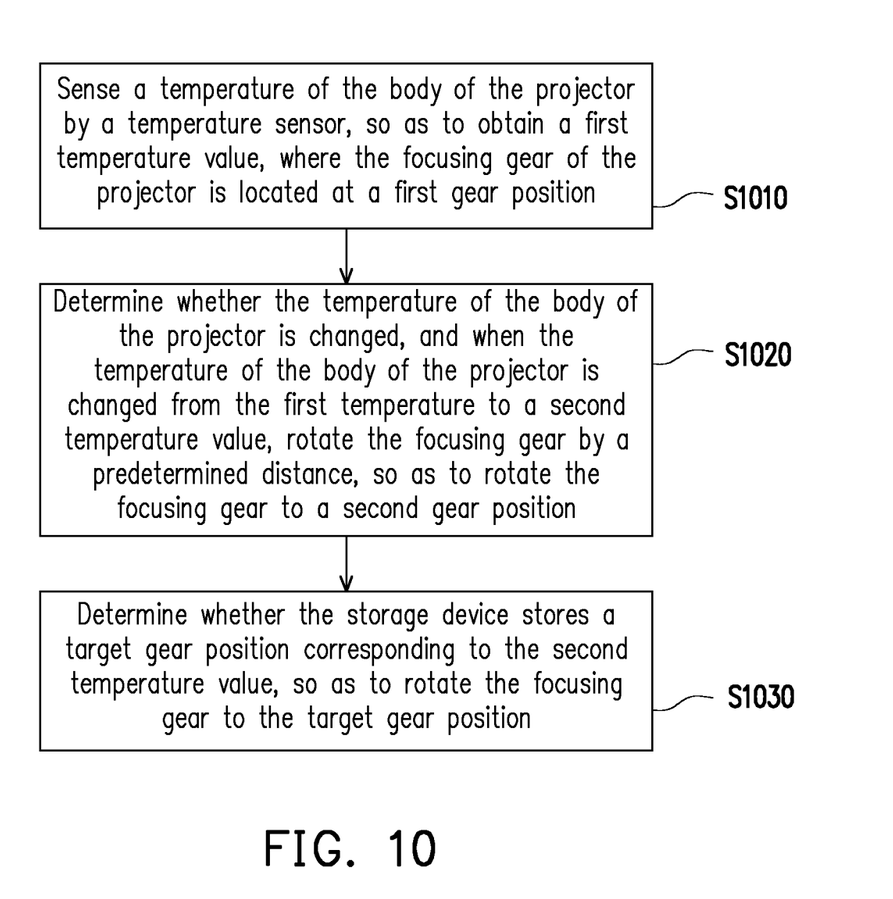
FIG. 10 is a flowchart illustrating a projection correction method according to an embodiment of the invention.

FIG. 10 is a flowchart illustrating a projection correction method according to an embodiment of the invention. Referring to FIG. 1 and FIG. 10, the projection correction method of the embodiment is at least adapted to the projector 100 of FIG. 1. In step S1010, the processing device 110 senses the temperature of the body of the projector 100 by the temperature sensor 120, so as to obtain a first temperature value, where the focusing gear of the projector 100 is located at a first gear position. In step S1020, the processing device 110 determines whether the temperature of the body of the projector 100 is changed, and when the temperature of the body of the projector 100 is changed from the first temperature value to a second temperature value, the processing device 110 drives the DC motor to rotate the focusing gear by a predetermined distance, so as to rotate the focusing gear to a second gear position. In step S1030, the processing device 110 determines whether the storage device 140 stores a target gear position corresponding to the second temperature value, so as to rotate the focusing gear to the target gear position. Therefore, the projection correction method of the embodiment may synchronously correct the gear position of the focusing gear along with the temperature variation of the body of the projector.

Moreover, enough instruction, recommendation and implementation explanations for other device features and implementation of the projector of the embodiment may be learned by referring to the embodiments of FIG. 1 to FIG. 10, and detail thereof is not repeated.

In summary, the projection correction method and the projector of the invention may correspondingly correct the gear position of the focusing gear according to a pre-stored characteristic curve along with the temperature variation of the body of the projector in an automatic or semi-automatic manner by the automatic focus compensation procedure and the manual focus compensation procedure. Moreover, the projector may execute the first pre-correction procedure and the second pre-correction procedure to obtain the characteristic curve and the reverse gain in advance, such that regardless a forward rotation process or a reverse rotation process of the focusing gear of the projector, the focusing gear may be rotated to the correct gear position. In this way, the projection image projected by the projection unit of the projector may still be maintained to a good focusing effect along with the temperature variation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection correction method, adapted to a projector, the projection correction method comprising:
    sensing a temperature of a body of the projector to obtain a first temperature value, wherein a focusing gear of the projector is located at a first gear position;
    determining whether the temperature of the body of the projector is changed, and when the temperature of the body of the projector is changed from the first temperature value to a second temperature value, rotating the focusing gear by a predetermined distance to rotate the focusing gear to a second gear position; and
    determining whether a storage device stores a target gear position corresponding to the second temperature value, so as to rotate the focusing gear to the target gear position.

2. The projection correction method as claimed in claim 1, wherein the step of determining whether the storage device stores the target gear position corresponding to the second temperature value, so as to rotate the focusing gear to the target gear position comprises:
    if the storage device stores the target gear position corresponding to the second temperature value, rotating the focusing gear to the target gear position; and
    if the storage device does not store the target gear position corresponding to the second temperature value, recording the second gear position to serve as the target gear position.

3. The projection correction method as claimed in claim 1, wherein the storage device comprises a plurality of storage positions, the plurality of storage positions are configured to store a plurality of target gear position data of the focusing gear corresponding to each unit temperature from an initial temperature value to a final temperature value, wherein the plurality of storage positions are rewritable.

4. The projection correction method as claimed in claim 1, further comprising:
    receiving a first adjusting signal by an input device, and rotating the focusing gear to a third gear position according to the first adjusting signal; and
    recording the third gear position to serve as the target gear position.

5. The projection correction method as claimed in claim 1, further comprising:
    executing a turn-on operation of the projector, and projecting a reference image;
    receiving a second adjusting signal by an input device, and rotating the focusing gear according to the second adjusting signal, so as to perform a focus adjusting operation on the reference image;
    after the focus adjusting operation is completed, recording a first reference temperature and a first reference position of the focusing gear;
    after a predetermined time, receiving a third adjusting signal by the input device, and rotating the focusing gear according to the third adjusting signal, so as to perform the focus adjusting operation on the reference image;

after the focus adjusting operation is completed, recording a second reference temperature and a second reference position of the focusing gear; and creating a characteristic curve according to the first reference temperature, the first reference position, the second reference temperature and the second reference position, and determining the predetermined distance according to the characteristic curve.

6. The projection correction method as claimed in claim 1, further comprising:

rotating the focusing gear towards a first rotation direction by a predetermined time, so as to rotate the focusing gear from a third reference position to a fourth reference position, and recording a first rotation amount;

rotating the focusing gear towards a second rotation direction by the predetermined time, so as to rotate the focusing gear from a fifth reference position to a sixth reference position, and recording a second rotation amount, wherein the first rotation direction is opposite to the second rotation direction; and calculating a rotation amount difference between the first rotation amount and the second rotation amount, and determining a reverse gain according to the first rotation amount, the second rotation amount and the rotation amount difference.

7. The projection correction method as claimed in claim 6, wherein the first rotation amount that the focusing gear is rotated towards the first rotation direction by the predetermined time is equal to a third rotation amount that the focusing gear is rotated towards the second rotation direction by the predetermined time multiplied by the reverse gain.

8. The projection correction method as claimed in claim 1, wherein the step of rotating the focusing gear by the predetermined distance to rotate the focusing gear to the second gear position comprises:

rotating a first gear by a motor, and engaging the first gear to the focusing gear, so as to rotate the focusing gear by the predetermined distance;

engaging the focusing gear to a second gear to synchronously rotate the second gear, and outputting a direct current voltage signal by a variable resistor integrated to the second gear; and determining a voltage value of the direct current voltage signal to obtain position data of the second gear position of the focusing gear.

9. A projector, comprising:

a focusing gear, located at a first gear position;

a temperature sensor, configured to sense a temperature of a body of the projector to obtain a first temperature value;

a processing device, coupled to the temperature sensor and controlling the focusing gear, wherein the processing device is configured to determine whether the temperature of the body of the projector is changed by the temperature sensor, and rotate the focusing gear by a predetermined distance when the temperature of the body of the projector is increased from the first temperature value to a second temperature value, so as to rotate the focusing gear to a second gear position; and a storage device, coupled to the processing device, wherein the processing device determines whether the storage device stores a target gear position corresponding to the second temperature value to rotate the focusing gear to the target gear position.

10. The projector as claimed in claim 9, wherein if the storage device stores the target gear position corresponding to the second temperature value, the processing device rotates the focusing gear to the target gear position, and if the storage device does not store the target gear position corresponding to the second temperature value, the processing device records the second gear position to serve as the target gear position.

11. The projector as claimed in claim 9, wherein the storage device comprises a plurality of storage positions, the plurality of storage positions are configured to store a plurality of target gear position data of the focusing gear corresponding to each unit temperature from an initial temperature value to a final temperature value, wherein the plurality of storage positions are rewritable.

12. The projector as claimed in claim 9, further comprising:

an input device, configured to receive a first adjusting signal, wherein the processing device rotates the focusing gear to a third gear position according to the first adjusting signal, and the processing device records the third gear position to serve as the target gear position.

13. The projector as claimed in claim 9, wherein the processing device further executes a first pre-correction procedure, and the first pre-correction procedure comprises:

executing a turn-on operation of the projector, and projecting a reference image;

receiving a second adjusting signal by an input device, and rotating the focusing gear according to the second adjusting signal, so as to perform a focus adjusting operation on the reference image;

after the focus adjusting operation is completed, recording a first reference temperature and a first reference position of the focusing gear;

after a predetermined time, receiving a third adjusting signal by the input device, and rotating the focusing gear according to the third adjusting signal, so as to perform the focus adjusting operation on the reference image;

after the focus adjusting operation is completed, recording a second reference temperature and a second reference position of the focusing gear; and creating a characteristic curve according to the first reference temperature, the first reference position, the second reference temperature and the second reference position, and determining the predetermined distance according to the characteristic curve.

14. The projector as claimed in claim 9, wherein the processing device further executes a second pre-correction procedure, and the second pre-correction procedure comprises:

rotating the focusing gear towards a first rotation direction by a predetermined time, so as to rotate the focusing gear from a third reference position to a fourth reference position, and recording a first rotation amount;

rotating the focusing gear towards a second rotation direction by the predetermined time, so as to rotate the focusing gear from a fifth reference position to a sixth reference position, and recording a second rotation amount, wherein the first rotation direction is opposite to the second rotation direction; and calculating a rotation amount difference between the first rotation amount and the second rotation amount, and determining a reverse gain according to the first rotation amount, the second rotation amount and the rotation amount difference.

15. The projector as claimed in claim 14, wherein the first rotation amount that the focusing gear is rotated towards the first rotation direction by the predetermined time is equal to a third rotation amount that the focusing gear is rotated towards the second rotation direction by the predetermined time multiplied by the reverse gain.

16. The projector as claimed in claim 9, further comprising:
   a first gear, engaged to the focusing gear;
   a second gear, engaged to the focusing gear, and integrated a variable resistor; and
   a motor, configured to rotate the first gear, so as to rotate the focusing gear by the predetermined distance, and synchronously rotate the second gear, such that the variable resistor outputs a direct current voltage signal,
   wherein the processing device determines a voltage value of the direct current voltage signal to obtain position data of the second gear position of the focusing gear.

* * * * *